US009929829B1

(12) United States Patent
Huang et al.

(10) Patent No.: US 9,929,829 B1
(45) Date of Patent: Mar. 27, 2018

(54) SYSTEM AND METHOD FOR PROVISIONING RESOURCES FOR LOSSLESS OPERATION IN A NETWORK ENVIRONMENT

(75) Inventors: Wei-Jen Huang, Burlingame, CA (US); Chih-Tsung Huang, Burlingame, CA (US)

(73) Assignee: Cisco Technology, Inc., San Jose, CA (US)

( * ) Notice: Subject to any disclaimer, the term of this patent is extended or adjusted under 35 U.S.C. 154(b) by 774 days.

(21) Appl. No.: 13/397,062

(22) Filed: Feb. 15, 2012

(51) Int. Cl.
*H04L 1/00* (2006.01)
(52) U.S. Cl.
CPC ..................................... *H04L 1/00* (2013.01)
(58) Field of Classification Search
None
See application file for complete search history.

(56) References Cited

U.S. PATENT DOCUMENTS

| | | | | |
|---|---|---|---|---|
| 2006/0067247 | A1* | 3/2006 | Rajan | H04L 12/2602 370/254 |
| 2009/0089623 | A1* | 4/2009 | Neering et al. | 714/39 |
| 2010/0061242 | A1* | 3/2010 | Sindhu et al. | 370/235 |
| 2011/0254608 | A1* | 10/2011 | Kai | H04B 10/2942 327/306 |
| 2012/0066407 | A1* | 3/2012 | Andries | H04L 41/5009 709/232 |

OTHER PUBLICATIONS

Hewlett-Packard Development Company, L.P., "Converged Networks and Fibre Channel Over Ethernet" White Paper, 20 pages, Nov. 2011, © 2011.
Hewlett-Packard Development Company, L.P., "Converged Networks With Fibre Channel Over Ethernet" Technology brief, 3$^{rd}$ ed., 9 pages, Oct. 2011, © 2010, 2011.
Cisco Systems, Inc., "Unified Fabric: Cisco's Innovation for Data Center Networks," White Paper, 10 pages, © 2009.
Cisco Systems, Inc., "Director-Class FCoE: Converge the Network with Cisco Nexus 7000 Series Switches and Cisco MDS 9500 Series Multilayer Directors," Jul. 2012, 11 pages http://www.cisco.com/en/US/solutions/collateral/ns340/ns517/ns224/ns945/ns1060/guide_c07-648629.pdf.
Cisco Systems, Inc., "Evolving Data Center Architectures: Meet the Challenge with Cisco Nexus 5000 Series Switches," White Paper, Jun. 2009, 28 pages.

(Continued)

*Primary Examiner* — Hassan Phillips
*Assistant Examiner* — Gautam Sharma
(74) *Attorney, Agent, or Firm* — Polsinelli PC

(57) ABSTRACT

A method is provided in one example embodiment that includes measuring a delay between a transmitter and a receiver in a network environment, where the receiver is associated with a buffer. A minimum absorption buffer size for lossless transmission to a queue may be determined based on the delay and a transmission bandwidth, and buffer units for the queue can be allocated based on the minimum absorption buffer size. The transmitter may also be rate-limited if the minimum absorption buffer size exceeds available storage of the buffer. In other embodiments, buffer units can be reclaimed if the available buffer storage exceeds the minimum absorption buffer size.

20 Claims, 6 Drawing Sheets

(56) References Cited

OTHER PUBLICATIONS

Cisco Systems, Inc., "Fibre Channel over Ethernet at a Glance," Feb. 2010, 2 pages, http://www.cisco.com/en/US/solutions/collateral/ns340/ns517/ns224/ns945/ns1060/at_a_glance_c45-578384.pdf.
Cisco Systems, Inc., "Fibre Channel over Ethernet Storage Networking Evolution," White Paper, Jun. 2010, 6 pages http://www.cisco.com/en/US/prod/collateral/switches/ps5718/ps6021/white_paper_c11-472771.pdf.
Cisco Systems, Inc., "Priority Flow Control: Build Reliable Layer 2 Infrastructure," White Paper, Jun. 2009, 8 pages http://www.cisco.com/en/US/prod/collateral/switches/ps9441/ps9670/white_paper_c11-542809.pdf.
"IEEE 1588: IEEE Standard for a Precision Clock Synchronization Protocol for Networked Measurement and Control Systems," IEEE Std. 1588-2008, Jul. 24, 2008, 289 pages http://standards.ieee.org/findstds/standard/1588-2008.html.

\* cited by examiner

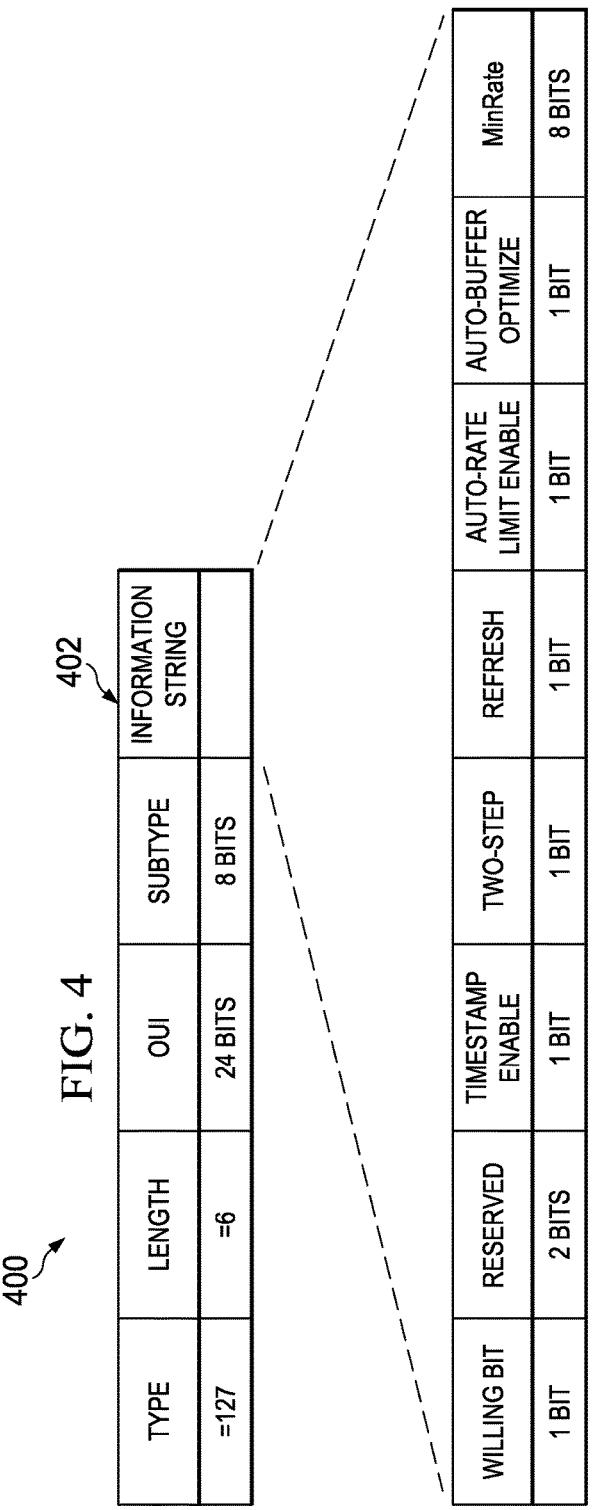
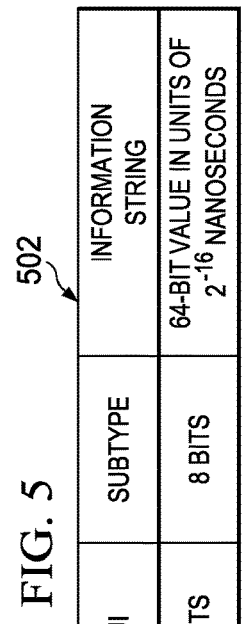
FIG. 4
FIG. 5

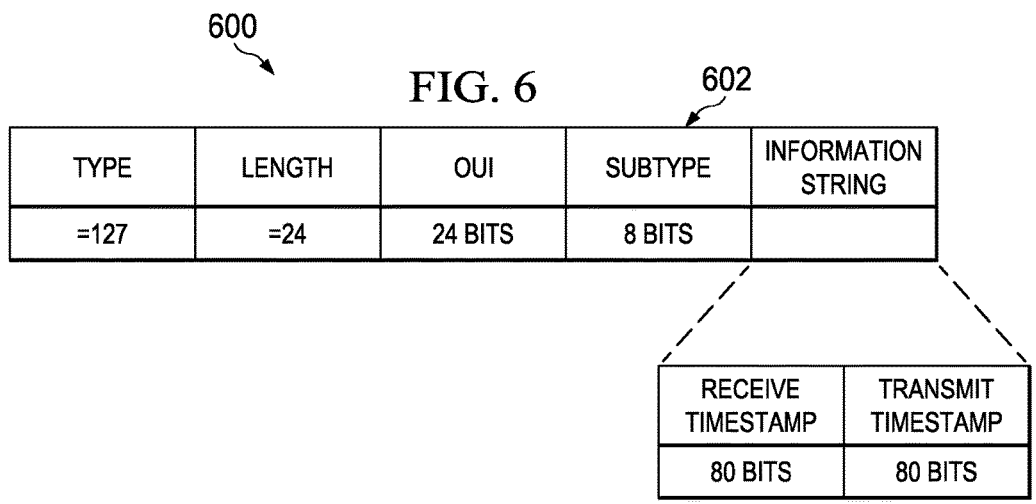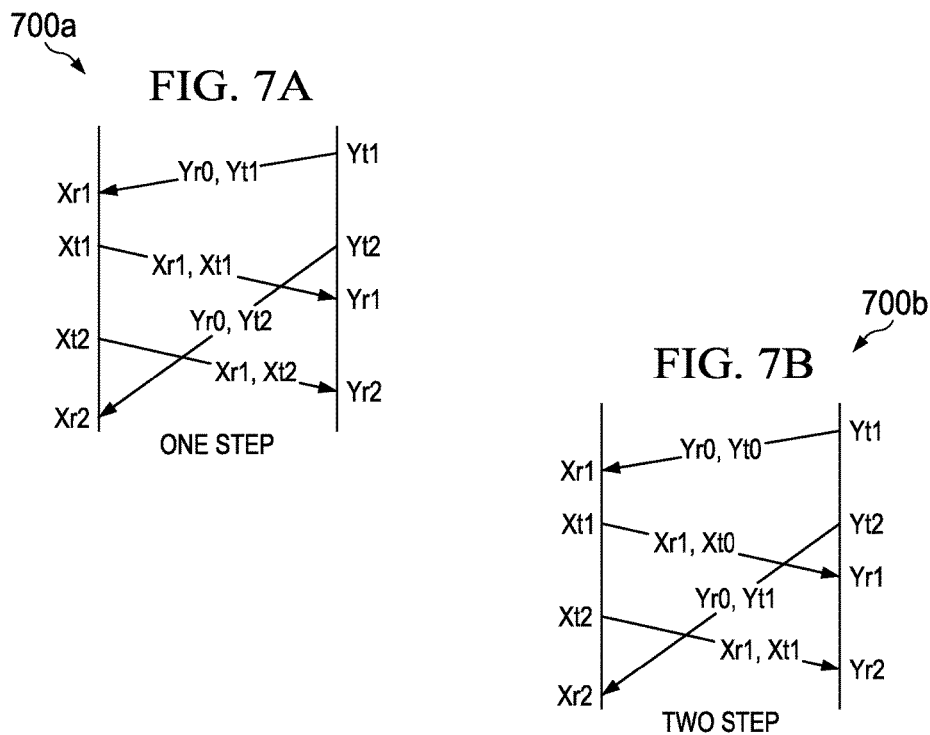

SYSTEM AND METHOD FOR PROVISIONING RESOURCES FOR LOSSLESS OPERATION IN A NETWORK ENVIRONMENT

TECHNICAL FIELD

This specification relates in general to the field of communications, and more particularly, to a system and a method for dynamically provisioning resources for lossless operation in a network environment.

BACKGROUND

Data center architectures are evolving to meet the demands and complexities imposed by increasing business requirements to stay competitive and agile. Industry trends such as data center consolidation, server virtualization, advancements in processor technologies, increasing storage demands, rise in data rates, and the desire to implement "green" initiatives can cause stress on current data center designs. Consolidation of input/output in the data center, allowing Fibre Channel and Ethernet networks to share a single, integrated infrastructure, helps enterprises address some of these challenges. An important pillar of this consolidated approach is Fibre Channel over Ethernet (FCoE).

The Ethernet network that supports FCoE is required to be a lossless Ethernet network, with switching devices that have internal architectures designed to offer a no-drop packet capability and network flow control mechanisms to enable lossless transmission of packets across the Ethernet infrastructure. Ethernet supports flow control to enable lossless operation, but flow control can require large amounts of buffering. Lossless operation over Ethernet cannot be supported over distances where bandwidth delay product requirements exceed buffer resources. Thus, managing resources to provide a lossless operation over long-distance links can present significant challenges to network operators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 is a simplified table illustrating a potential link layer discovery protocol data unit for configuration that may be associated with example embodiments of the network environment;

FIG. 5 is a simplified table illustrating a potential link layer discovery protocol data unit that may be associated with round-trip time measurement in example embodiments of the network environment;

FIG. 6 is a simplified table illustrating a potential link layer discovery protocol data unit that may be associated with round-trip time measurement in other example embodiments of the network environment;

FIGS. 7A-7B are simplified sequence diagrams illustrating potential operations that may be associated with exchanging timestamps for round-trip time measurement in example embodiments of the network environment.

DETAILED DESCRIPTION OF EXAMPLE EMBODIMENTS

Overview

A method is provided in one example embodiment that includes measuring a delay between a transmitter and a receiver in a network environment, where the receiver is associated with a buffer. A minimum absorption buffer size for lossless transmission to a queue may be determined based on the delay and a transmission bandwidth, and buffer units for the queue can be allocated based on the minimum absorption buffer size. The transmitter may also be rate-limited if the minimum absorption buffer size exceeds available storage of the buffer.

In other embodiments, a method is provided that includes measuring a delay between a transmitter and a receiver in a network environment, where the transmitter is associated with a transmission bandwidth and the receiver is associated with a buffer. A minimum absorption buffer size for lossless transmission may be determined based on the delay and the transmission bandwidth, and buffer units can be reclaimed if the available buffer storage exceeds the minimum absorption buffer size.

EXAMPLE EMBODIMENTS

Figure 1:
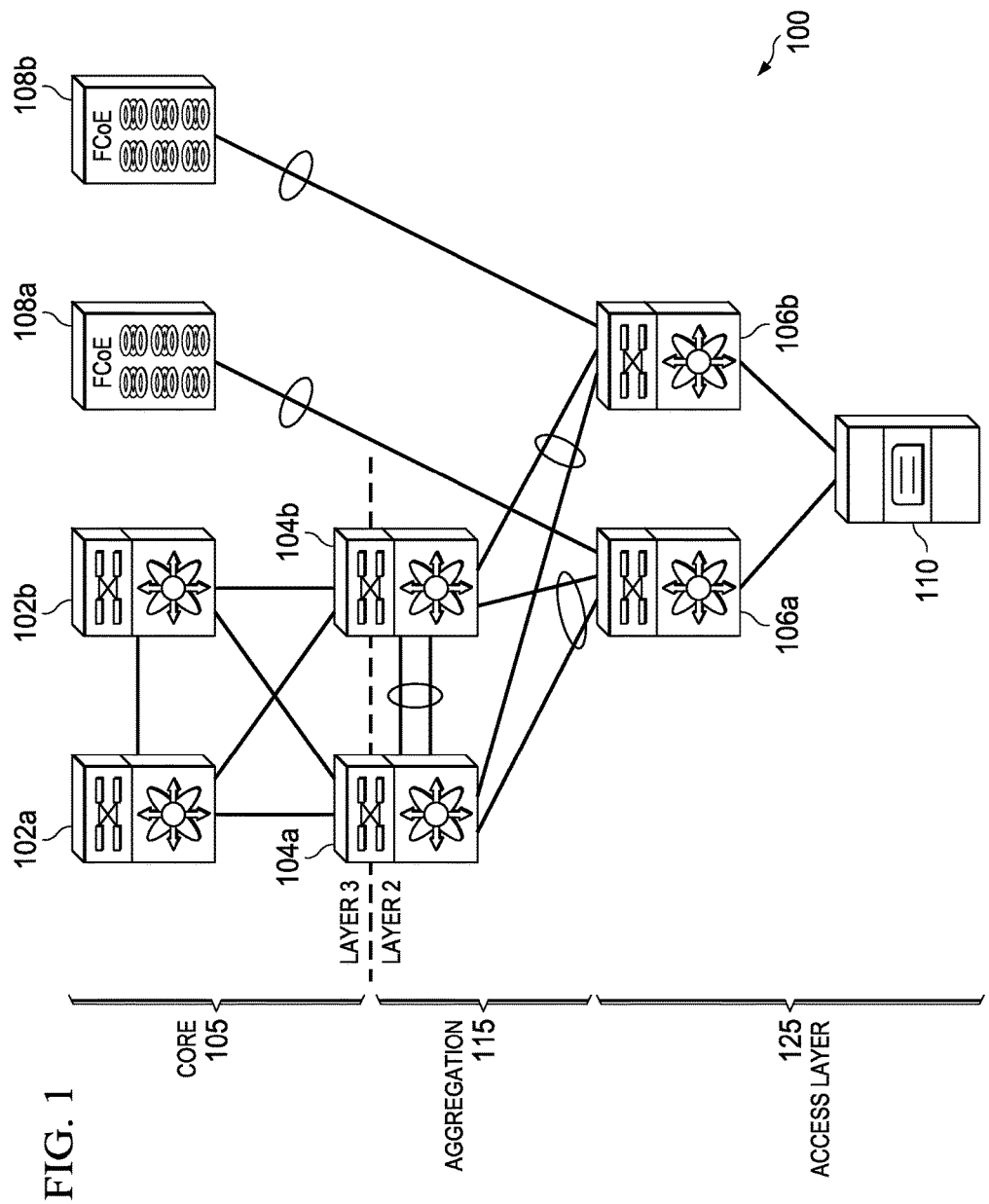
FIG. 1 is a simplified block diagram illustrating an example embodiment of a network environment in accordance with this specification.

Turning to FIG. 1, FIG. 1 is a simplified block diagram of an example embodiment of a network environment 100 in which resources for lossless operation can be dynamically provisioned. Network environment 100 includes a core layer 105, an aggregation layer 115, an access layer 125, and storage area networks (SANs) 108a-108b. Core layer 105 generally represents the backbone of the network and may include high-end switches (e.g., switches 102a-102b) and high-speed cables such as fiber cables. Core layer 105 is generally responsible for fast and reliable transportation of data across a network. Aggregation layer 115 typically includes routers and layer 3 switches (e.g., switches 104a-104b) to ensure that packets are properly routed. Access layer 125 may include hubs and switches (e.g., switches 106a-106b) and connects clients and servers (e.g., a server 110) to the network. Access layer 125 may also connect SANs 108a-108b to the network.

Each of the elements of FIG. 1 may couple to one another through simple interfaces or through any other suitable connection, which provides a viable pathway for network communications. Additionally, any one or more of these elements may be combined or removed from the architecture based on particular configuration needs. Network environment 100 may include a configuration capable of Ethernet communications, and may also operate in conjunction with transmission control protocol/Internet protocol (TCP/IP) communications for the transmission or reception of packets in a network flow. Network environment 100 may also operate in conjunction with a user datagram protocol/IP (UDP/IP) or any other suitable protocol where appropriate and based on particular needs. Input/output (I/O) may be consolidated in network environment 100 so that the same physical infrastructure can carry different types of traffic, which typically have very different traffic characteristics and transmission requirements.

For purposes of illustrating certain example embodiments of network environment 100, it is important to understand certain activities and communications occurring within a network. Contextual information is provided below to offer an overview of some challenges of managing network resources. Such information is offered earnestly and for teaching purposes only and, therefore, should not be construed in any way to limit the broad applications of the present disclosure. In certain embodiments, network environment 100 is representative of a data center environment. Data center environments are adapting to accommodate higher expectations for growth, consolidation, and security. New demands for uptime and serviceability coupled with the new technology and protocols make the design of the data center more challenging. Business needs require highly reliable applications, which in turn require more servers in the data center and secondary data centers to accommodate the need for business continuity.

New technologies such as multi-core processors, multi-socket motherboards, inexpensive memory, and Peripheral Component Interconnect (PCI) bus technology represent a major evolution in the computing environment. These advancements provide access to greater performance and resource utilization at a time of exponential growth of digital data and globalization through the Internet. Multithreaded applications designed to use these resources are both bandwidth intensive and require higher performance and efficiency from the underlying infrastructure.

While data center performance requirements are growing, technology managers are seeking ways to limit physical expansion by increasing the utilization of current resources. Server consolidation through server virtualization has become an appealing option. The use of multiple virtual machines can take full advantage of a physical server's computing potential and enable a rapid response to shifting data center demands. This rapid increase in computing power coupled with the increased use of virtual machine environments is increasing the demand for higher bandwidth and at the same time creating additional challenges for the network.

Power continues to be one of the top concerns facing data center operators and designers. Data center facilities are designed with a specific power budget (e.g., in kilowatts per rack or watts per square foot). Per-rack power consumption has steadily increased over the past several years. Growth in the number of servers and advancement in electronic components continue to consume power at an exponentially increasing rate. Per-rack power requirements constrain the number of racks a data center can support, resulting in data center that are out of capacity even though there is plenty of unused space. Approximately half of the power required by the data center is consumed by cooling.

Cabling also represents a significant portion of a typical data center budget. Cable sprawl can limit data center deployments by obstructing airflows and requiring complex cooling system solutions. Organizations continue to seek out innovative solutions that will enable them to keep up with this rapid growth through increased efficiency and low cost.

FCoE is one innovation that can address some of these challenges and allow customers to evolve their data centers by consolidating fragmented systems to create a unified fabric. Ethernet technology and pools of disparate data center resources can be combined into shared groups that are linked by an intelligent information network. FCoE can allow Fibre Channel communications to run over Ethernet. Fibre Channel is typically used for storage networking, supporting data communications between devices that connect servers with storage devices and between storage controllers and disk drives. Fibre Channel provides a lossless medium through a buffer-to-buffer credit system, which uses a pre-shared knowledge of the number of buffers available on each end. A transmitter can inject the exact number of packets that saturates the receiver buffers and then stop transmitting, without any explicit feedback from the receiver. The receiver notifies the transmitter when those buffers become free as the packets are drained, so that both ends can keep a consistent view of available buffers on the receiver. These notifications are sent in the form of a receiver-ready ordered set.

To support Fibre Channel frames over Ethernet, Ethernet transmissions should also be lossless (i.e., no frames can be dropped throughout the entire transmission). On the Ethernet side, ordered sets are not normally available primitives, and all processing is performed at the frame unit. Trying to mimic Fibre Channel buffer crediting would consume 16 times as much bandwidth. Consequently, Ethernet implements a threshold system for flow control to enable lossless operations. Instead of keeping the free buffer count in sync between sender and receiver, Ethernet uses a form of feedback that requires explicit communication in response to low-buffer conditions. Institute of Electrical and Electronics Engineers (IEEE) standard 802.3 Ethernet, for example, uses the IEEE 802.3x PAUSE control frames and IEEE 802.1Qbb/802.3bd Priority-based Flow Control frames. IEEE 802.3x PAUSE is defined in Annex 31B of the IEEE 802.3 specification. Priority-based Flow Control (PFC) frames are defined in Annex 31D of IEEE 802.3.

In general terms, a receiver can generate a media access control (MAC) control frame and send a pause request (e.g., IEEE PAUSE/PFC XOFF) to a sender when it predicts the potential for buffer overflow. Upon receiving the control frame, the transmitter responds by stopping transmission of any new packets until the receiver is ready to accept them again. The receiver, though, should still be able to absorb all data that was transmitted before the transmitter received the pause request. This absorption buffering is frequently referred to as the "bandwidth delay product." This buffering also represents the minimum amount of memory needed in order to support lossless operation. Additional buffering can also be allocated for response time.

A buffer in such a threshold flow control system can have two associated thresholds, referred to herein as the high-watermark (HWM) threshold and the low-watermark (LWM) threshold. The high-watermark threshold triggers a flow-off signal, such as XOFF, and the low-watermark threshold triggers a flow-on signal, such as XON. The high watermark is the maximum number of buffer units (e.g., cells) that can be used in a queue or set of queues without a pause signal. Stated another way, the number of buffer units needed for absorption buffering (referred to herein as the "absorption buffer") is the total number of units less the high-watermark. In general, the size of the absorption buffer needs to increase as the distance between transmitter and sender increases. The absorption buffer can be increased (i.e., the high-watermark can be lowered) to maintain correctness (i.e., no drops), but this has the side effect of increasing the frequency of pause signals, since a lower threshold is reached more frequently. More frequent PAUSE signals imply lower link utilization.

IEEE 802.1Qbb Priority Flow Control (PFC) and IEEE 802.3bd Annex 31D extend the granularity of IEEE 802.3x PAUSE to accommodate different priority classes. Using PFC, a link is divided into eight lanes, where PAUSE is applied on a per-lane basis such that PAUSE in one lane does not affect the other lanes. With the capability to enable PAUSE on a per-user-priority basis, a lossless lane for Fibre Channel can be created while retaining packet-drop congestion management for IP traffic. This mechanism allows storage traffic to share the same link as non-storage traffic. IEEE 802.1Qaz Enhanced Transmission Selection (ETS) is used to assign traffic to a particular virtual lane using IEEE 802.1p class of service (CoS) values to identify the virtual lane to which traffic belongs. Using PFC and ETS allows administrators to allocate resources, including buffers and queues, based on user priority, which results in a higher level of service for critical traffic where congestion has the greatest effect.

To achieve lossless operation, a receiver using PFC should predict the potential for buffer exhaustion for a CoS, and respond by generating an explicit PAUSE frame for that CoS when that condition arises. The receiver should have enough buffer units in the absorption buffer for the CoS to store packet(s) that might be in flight while the PAUSE frame travels back to the transmitter and is processed. Thus, the PAUSE frame should be sent back to the other end of the wire early enough to allow the transmitter time to stop transmitting before buffers overflow on the receiving side. Since bits on a wire travel at a finite speed, the length of the wire affects how early the receiving end should act. The longer the wire, the earlier a receiver should send back a PAUSE frame. Providing an appropriate buffer threshold (i.e., absorption buffer) on the receiver side is critical to a functioning PFC implementation.

However, the number of variables and interactions that should be considered when allocating an appropriate buffer threshold can be very complex. For example, to configure a receiver with an appropriate threshold for a PAUSE implementation, the maximum transmission unit (MTU) of both the receiver and sender should be considered, along with the speed of the wire, transceiver latency, and response time of the sender. Moreover, the internal buffer management strategy used by a receiver normally allocates one or more non-contiguous blocks of memory (referred to herein as a "buffer unit") for storing each packet, and the block size may vary significantly among implementations. The block size should also be considered when allocating a buffer threshold, since the block size affects the way that a contiguous flow of bytes from a sender consumes receiver buffers. Vendors generally consider buffer allocation to be too complex for direct manipulation by end-users and impose a maximum distance for deployment.

In accordance with embodiments disclosed herein, network environment 100 can overcome these shortcomings (and others) by providing a system and a method for allocating resources for lossless operation with optimized bandwidth selection, which may be particularly advantageous over long-distance links. In example embodiments, network environment 100 can determine the amount of buffering needed for lossless operation and line rate performance. In some embodiments, network environment 100 can further inform a user if a link is too long for a given bandwidth and buffer resources, and/or lower bandwidth to a minimum needed for lossless performance if resources are inadequate for full speed over a given link distance.

For example, in more particular embodiments of network environment 100, a link may be negotiated for link bandwidth requirements (in a flexible range form) on a link-wide basis and/or user-priority basis. Such requirements may be either hard requirements or soft requirements. A link may also be negotiated for sending and receiving frames for round-trip time (RTT) measurement and exchanging additional optional accuracy adjustment parameters. In some embodiments, a link layer discovery protocol (such as specified in IEEE 802.1AB) and (optionally) hardware-assisted frame timestamping may be relied upon to facilitate RTT measurement. RTT measurement can be performed using timestamping and timestamp transfer purposes. A precision time protocol (such as specified by IEEE 1588) hardware assist (single-step or two-step) can also be deployed for this purpose to measure egress and ingress timestamps at two ends of a link.

RTT can be determined and link negotiation may fail if a hard requirement for bandwidth balanced against buffer availability is not met, or a user notification can advertise the imbalance and provide remedial suggestions, for example. If bandwidth and/or buffering requirements are soft, an appropriate aggregate and/or group (class) shaper can be installed and/or optimal buffering can be provided. A user notification can advertise speed and/or buffering results based on a query or other logging mechanism. Negotiation of capabilities and requirements, along with RTT calibration, may be periodic in some example embodiments to discover environment changes, such as securing additional buffers through licensing or reallocation of buffer resources.

As a separate matter, it should be noted that port densities are increasing rapidly, yet new designs have been decreasing in capacity on a per-port basis. This is largely because new designs are relying on capacity sharing. In contrast to these activities, the architecture of the present disclosure provides a mechanism for smart buffer provisioning, where the equipment can provision (precisely) the amount of buffering needed. This leaves significant and valuable headroom for ever-scarcer buffering resources, which lie elsewhere in various network locations.

Figure 2:
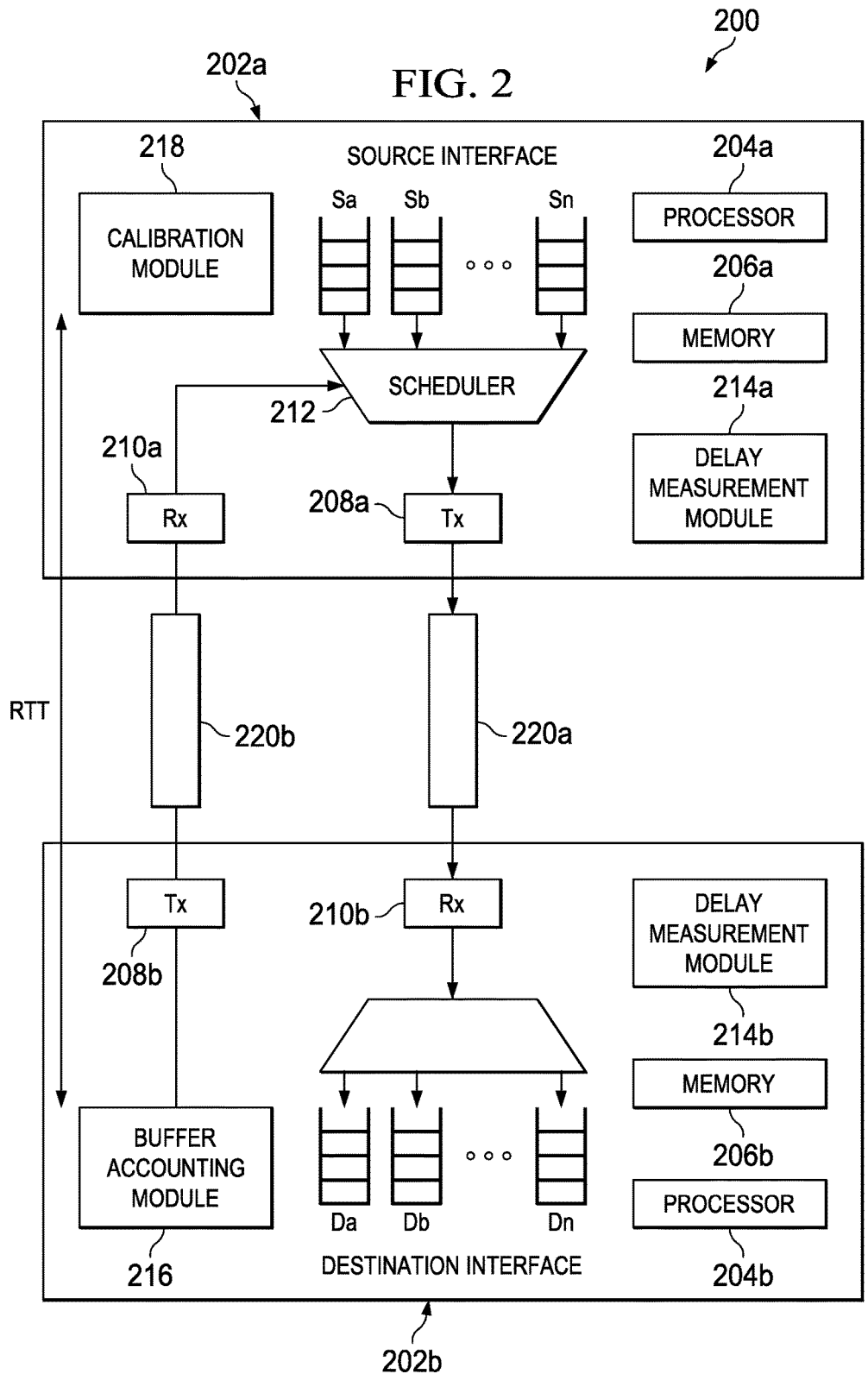
FIG. 2 is a simplified block diagram illustrating additional details that may be associated with example embodiments of the network environment.

Turning to FIG. 2, FIG. 2 is a simplified block diagram 200 illustrating additional details that may be associated with example embodiments of network environment 100. To simplify the illustration and the description, FIG. 2 illustrates only an asymmetric configuration, but other embodiments may be full duplex. FCoE and lossless fabrics generally require full duplex lossless operation. FIG. 2 includes interfaces 202a-202b, which may be associated with any two elements in network environment 100, such as switch 106a and SAN 108a, for example. Interfaces 202a-202b may include a processor 204a-204b, a memory 206a-206b, a transmitter (Tx) 208a-208b, and a receiver (Rx) 210a-210b, respectively. Moreover, interfaces 202a-202b may include additional hardware and/or software elements to facilitate operations described herein, including source queues Sa-Sn, scheduler 212, delay measurement modules 214a-214b, buffer accounting module 216, calibration module 218, and destination queues Da-Dn. Interfaces 202a-202b can also be configured to store, aggregate, process, export, and/or otherwise maintain data in any appropriate format, where these activities can involve processors 204a-204b and/or memory element 206a-206b, for example.

In operation, signals (e.g., Ethernet frames) can be transmitted between transmitters 208a-208b and receivers 210a-210b, respectively, over links 220a-220b. For example, data to be transmitted can be stored in source queues Sa-Sn, and scheduler 212 can retrieve the data from queues Sa-Sn (as appropriate) for transmission through transmitter 208*a*. The data may be received by receiver 210*a* and mapped to destination queues Da-Dn.

In general, a "buffer" refers to any resource or resources (e.g., a region of storage or memory) that can be used to temporarily hold data for transmission or processing, and "buffering" is an accounting of buffer resources for a queue or set of queues. Queues are the basis for priority and weighted scheduling. Buffer resources can be dedicated to particular queues (programmably carved of N cells per queue), or can be carved into regions (which themselves can be overlapping as long as total is not violated), and within each region shared across certain queues (which means PFC/PAUSE is shared since resources are shared). Buffer resources can also be a hybrid of dedicated and shared, where a queue or group of queues can consume from both its dedicated resources and globally/further sub-grouped shared resources depending on relative occupancies in the entire system.

Flow control is based on buffer resource allocations and defines whether packets can go from certain queues. Mapping between queues may be one-to-one, such that data from Sa is stored in queue Da, Sb in Db, etc., or it may be many-to-one, such that Sa-Sc may be stored in Da, for example. For maximum flexibility, buffer accounting for flow control threshold purposes can be on a per-queue basis or on a per-group of queues basis. The concept of queues is for scheduling and prioritization purposes such as through IEEE 802.1Qaz ETS. Flow control may be implemented with thresholds (e.g., PAUSE, PFC, XON/XOFF) or credits (e.g. Fibre Channel).

Buffer accounting module 216 can track and manage usage of buffer resources in destination queues Da-Dn and signal scheduler 212 accordingly (e.g., to stop transmitting if use of buffer resources exceeds a threshold). PAUSE/PFC signaling may be in-band or out-of-band. Delay measurement modules 214*a*-214*b* can measure RTT, which generally reflects all delays including internal scheduling and queuing/accounting delays. Additionally or alternatively, internal delays can be compensated for with a conservative budget. Calibration module 218 can dynamically establish a receiver absorption buffer threshold based on RTT, as described in more detail below.

Elements in network environment 100, including switches 102*a*-102*b*, switches 104*a*-104*b*, switches 106*a*-106*b*, server 110, and others, are representative of any suitable network element or node, which is meant to encompass network appliances, servers, routers, switches, gateways, bridges, load balancers, modules, or any other device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with elements of network environment 100, each of switches 102*a*-102*b*, switches 104*a*-104*b*, switches 106*a*-106*b*, server 110, and others can include memory elements for storing information to be used in the operations outlined herein. Moreover, each element may include one or more interfaces, such as interfaces 202*a*-202*b*, and such interfaces may also include appropriate memory elements (e.g., source queues Sa-Sn and destination queues Da-Dn). Each of switches 102*a*-102*b*, switches 104*a*-104*b*, switches 106*a*-106*b*, server 110, and others may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Any of the memory elements discussed herein should be construed as being encompassed within the broad term "memory element" or "memory." Information being used, tracked, sent, or received by switches 102*a*-102*b*, switches 104*a*-104*b*, switches 106*a*-106*b*, server 110, and others could be provided in any database, register, queue, table, cache, control list, or other storage structure, all of which can be referenced at any suitable timeframe. Any such storage options may be included within the broad term "memory element" or "memory" as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory media. In some of these instances, memory elements can store data used for the operations described herein. This includes the memory elements being able to store software, logic, code, or processor instructions that are executed to carry out the activities described herein.

In one example implementation, switches 102*a*-102*b*, switches 104*a*-104*b*, switches 106*a*-106*b*, server 110, and others may include software modules (e.g., calibration module 218) to achieve, or to foster, operations as outlined herein. In other embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Additionally, each of switches 102*a*-102*b*, switches 104*a*-104*b*, switches 106*a*-106*b*, server 110, and others may include one or more processors (or virtual processors) that can execute software or an algorithm to perform activities as discussed herein. A processor or virtual processor can execute any type of instructions associated with the data to achieve the operations detailed herein. In one example, a processor (such as shown in FIG. 2) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term "processor."

Figure 3:
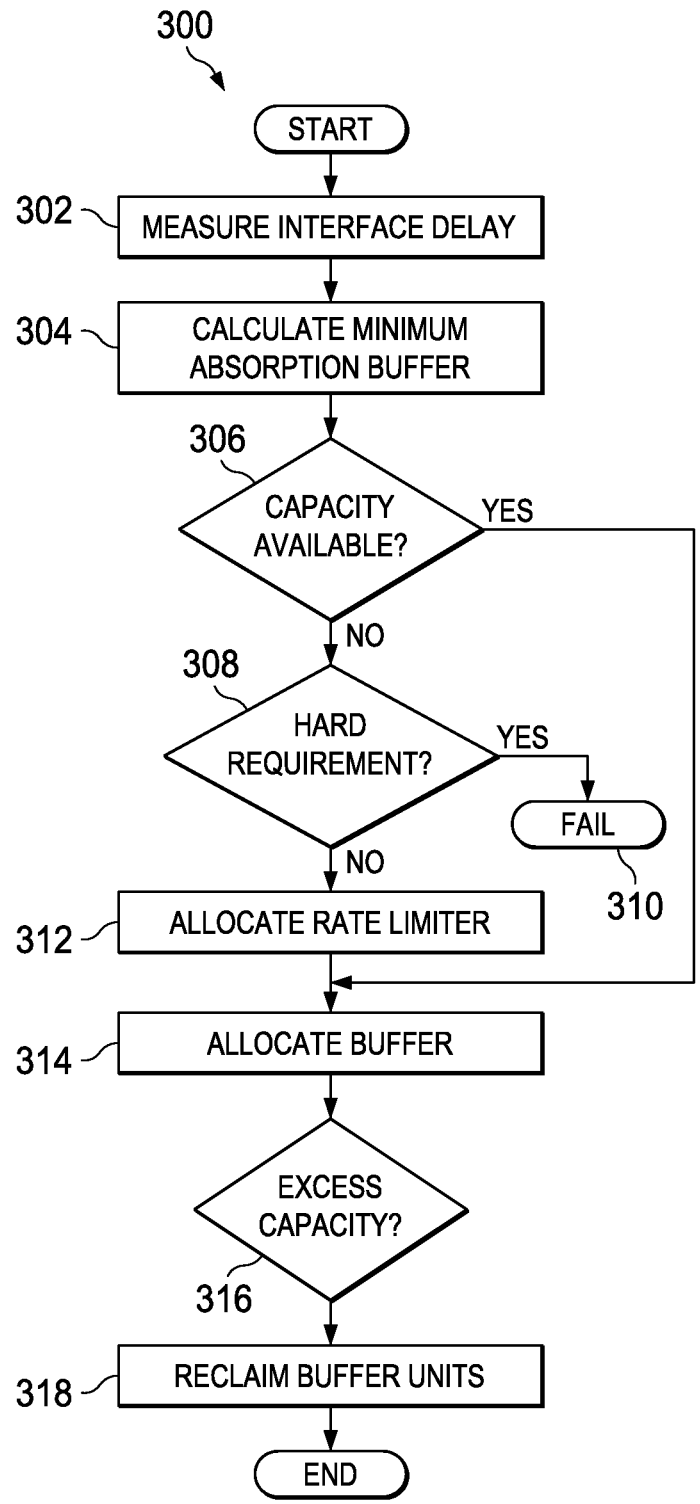
FIG. 3 is a simplified flow diagram illustrating potential operations that may be associated with example embodiments of the network environment.

FIG. 3 is a simplified flow diagram 300 illustrating potential operations that may be associated with example embodiments of network environment 100. In more particular embodiments, such operations may be implemented in a source and/or destination interface, such as interfaces 202a-202b, including delay measurement modules 214a-214b, buffer accounting module 216, and/or calibration module 218, for example. As a preliminary matter, an administrator or other user may specify maximum buffer usage per destination queue, and may also specify a minimum bandwidth requirement, on a per-application basis for example. The specification may include hard or soft requirements. Alternatively, a vendor may configure such limits.

At 302, an interface delay may be measured. For example, a link may be negotiated for sending and receiving frames for RTT measurement, and exchanging additional optional accuracy adjustment parameters. In some embodiments, the delay may be measured by measuring the RTT of a packet sent and immediately looped back, for example, while in other embodiments, a precision time protocol may be used. For example, RTT can be calculated as Xr2-Xt1-(Yt2-Yr1) (e.g., shown in 700a of FIG. 7A), where X and Y are clocks independently maintained at both ends of a link. Thus, clocks X and Y do not need to be synchronized, but RTT accuracy can benefit from clock synchronization. Clock synchronization can be accomplished through tracking drift between absolute times of clocks X and Y across RTT measurements, for example. Timestamping can be performed at transmitter/receiver interfaces (e.g., MAC/PHY) or closer to a transmitter scheduler or receiver buffer.

Delay adjustment information can be carried in control frames, such as in an extensible link layer discovery protocol (LLDP) type-length-value structure, or through standard adjustments such as a pause quanta response time (e.g., as specified in IEEE 802.3). LLDP refers to any protocol that can be used by network devices to advertise or negotiate link capabilities on a network, particularly on Ethernet links. LLDP may be implemented according to standards specified in IEEE 802.1AB, for example, or may be implemented in similar proprietary or vendor-specific protocols, such as Cisco Discovery Protocol, Nortel Discovery Protocol, or Microsoft's Link Layer Topology Discovery. The delay may be measured at interface startup, or may be measured periodically in some embodiments.

At 304, a minimum absorption buffer size can be calculated based on the interface delay and a specified bandwidth requirement. If the minimum absorption buffer size exceeds the buffer capacity available for the bandwidth requirement at 306 and the bandwidth requirement is determined to be a hard requirement at 308, then link negotiation should fail at 310. Alternatively or additionally, a notification may be provided to an administrator or other user.

If the minimum absorption buffer size exceeds the buffer capacity available for the bandwidth requirement at 306 and the bandwidth requirement is determined to be a soft requirement at 308, then a rate-limiter may be allocated at 312. Bandwidth and buffer negotiation can be resolved with either a transmitter or a receiver interface. For example, a receiver can advertise available buffer space and optionally a required bandwidth. A transmitter can compute bandwidth capacity using the bandwidth delay product (which is the product of the measured RTT and the line rate) for flow control protection. In various embodiments, the transmitter may allocate an appropriate rate limiter in the scheduler for each lossless destination queue. Transmission rates can be granularly limited, such as on a per-priority class basis (one-to-one) or collectively based on a group of priorities (many-to-one and/or groups of one-to-one treated collectively). For example, if the bandwidth delay product is too high to support a soft bandwidth requirement advertised by a receiver, a rate limiter may be applied to provide maximum available bandwidth. In another example, a rate limiter may be applied to conserve buffer resources if bandwidth capacity exceeds an advertised requirement.

If the buffer capacity is sufficient for the minimum absorption buffer size at 306, then buffer units can be allocated for the absorption buffer at 314. Some embodiments of network environment 100 may have shared buffer pools and dedicated per-port pools of buffers. For example, buffer resources can be allocated to particular queues, or can be carved into regions and shared across queues within each region. Buffer resources can also be allocated as a hybrid of dedicated and shared, where a queue or group of queues can consume from both its dedicated resources and globally/further sub-grouped shared resources depending on relative occupancies in the entire system. If the available buffer capacity exceeds the minimum absorption buffer size at 316, buffer units may also be reclaimed at 318. For example, a transmitter can signal a receiver that only a certain amount of buffer space is required, and the receiver can reclaim any excess buffer space for buffer sharing. Reclaimed space can enter another port's dedicated buffer space (for that port's distance requirement), enter the shared pool across multiple ports/queues, or be held in reserve for future use, for example. Reclaiming buffer space may be applied in embodiments that use threshold flow control (e.g., PAUSE/PFC) or crediting (e.g. Fibre Channel).

It should also be appreciated that PAUSE refresh time and PAUSE quanta can be tuned based on RTT. Larger RTTs can afford a higher refresh rate for PAUSE frames. Allowing PAUSE quanta to expire can be faster than waiting for RTT of XON. PAUSE quanta stored in a PAUSE frame can account for link delay for delay drop. In one form, the PAUSE quanta requested can scale linearly with link delay up to a system/user configurable limit.

FIG. 4 is a simplified table 400 illustrating a potential link layer discovery protocol data unit (LLDPDU) that may be associated with example embodiments of network environment 100. Network elements can send LLDP information from each of their interfaces at a fixed interval, in the form of an Ethernet frame. Each frame contains an LLDPDU, and each LLDPDU is a sequence of type-length-value (TLV) structures. The Ethernet frame used in LLDP has its destination MAC address typically set to a special multicast address that compatible bridges do not forward; other multicast and unicast destination addresses are permitted. Each LLDP frame in the current IEEE 802.1AB implementation starts with the following mandatory TLVs: Chassis ID, Port ID, and Time-to-Live. The mandatory TLVs are followed by any number of optional/custom TLVs. The frame ends with a special TLV, named end of LLDPDU, in which both the type and length fields are 0. Custom TLVs may be supported via a specific TLV type. IEEE 802.1AB, for example, supports custom TLVs with a type 127. The value of a custom TLV generally starts with an organizationally unique identifier (OUI) and a 1-byte organizationally specific subtype followed by data.

FIG. 4 illustrates one example of a TLV that may be used to configure RTT measurement with LLDP. Link partners can advertise a configuration TLV such as TLV 402 to enable timestamping for RTT measurement purposes using symmetric attribute passing. In the example implementation of configuration TLV 402, the TLV type is 127 (as in the IEEE 802.1AB standard), and the information string length is 6 octets (which is inclusive of the OUI, subtype, and information string). The OUI may be any arbitrary 24-bit value, and the subtype may be any 8-bit value in this example. The OUI and/or subtype may be allocated in a standard or defined by a vendor in various embodiments. In this example implementation, the information string in TLV 402 includes eight fields: a willing bit, a 2-bit reserved field, a timestamp enable bit, a two-step bit, a refresh bit (representing repeated measurement enable), an auto-rate limit enable bit, an auto-buffer optimize bit, and an 8-bit minimum rate field (representing MinRate/256 as the minimum required rate requested).

FIG. 5 is a simplified table 500 illustrating an LLDPDU 502 that may be associated with RTT measurement in example embodiments of network environment 100. Once configuration mode is established, timestamps or round-trip times can be passed through information attributes from a slave device towards a master device across a link. Periodicity of messaging may be configurable in some embodiments.

For example, if RTT is recorded as a result of IEEE 1588 time synchronization, RTT may be passed in an LLDPDU such as LLDPDU 502 in FIG. 5 with a TLV type 127 and an information string length of 12 octets. The OUI may be any arbitrary 24-bit value, and the subtype may be any 8-bit value in this example. The OUI and/or subtype may be allocated in a standard or defined by a vendor in various embodiments. In this example implementation, the information string in TLV 502 is a 64-bit value in units of $2^{-16}$ nanoseconds of RTT. Thus, an LLDPDU with a configuration TLV such as TLV 402 may be sent to enable auto-provisioning. RTT may be measured with time synchronization (where the slave knows the RTT), and RTT may be passed in an LLDPDU such as LLDPDU 502 from the slave to the master across the link. Auto-provisioning may be enabled for rate-limiting at the transmitter, and buffer optimization may be enabled at the receiver.

FIG. 6 is a simplified table 600 illustrating an LLDPDU that may be associated with RTT measurement in other example embodiments of network environment 100. More particularly, if RTT is measured through LLDP, timestamps may be exchanged in an LLDPDU such as LLDPDU 602, with programmable periodicity. In this example embodiment, the LLDPDU again uses a TLV type 127, but with an information string length of 24 octets. The OUI may be any arbitrary 24-bit value, and the subtype may be any 8-bit value in this example. The OUI and/or subtype may be allocated in a standard or defined by a vendor in various embodiments. In this example implementation, the information string in TLV 602 includes two fields: an 80-bit receive timestamp field and an 80-bit transmit timestamp field. Such fields may be representative of an IEEE 1588-2008 timestamp (Uinteger 48 secondsField, Uinteger 32 nanosecondsField), for example. Thus, in this example embodiment, an LLDPDU with a configuration TLV such as TLV 402 may be sent to enable auto-provisioning, and LLDP informational TLVs such as TLV 602 may carry arrival and departure timestamps, and an LLDP RTT message may be sent from the slave to the master across the link. Auto-provisioning may be enabled for rate-limiting at the transmitter, and buffer optimization may be enabled at the receiver.

FIGS. 7A-7B are simplified sequence diagrams 700a and 700b, respectively, illustrating potential operations that may be associated with exchanging timestamps for RTT measurement in example embodiments of network environment 100. Such embodiments may implement LLDPDU 602, for example. In FIGS. 7A-7B, each diagonal line represents one LLDP packet exchanged between link partners X and Y. Xt<num> represents a packet's departure (transmit) time according to the clock at X, and Xr<num> represents a packet's arrival (receive) time according to the clock at X. Similarly, Yt<num> represents a packet's departure time according to the clock at Y; Yr<num> represents a packet's arrival time according to the clock at Y. In FIG. 7B, packets carry the timestamp of the previous packet sent.

As described herein, network environment 100 can provide many significant advantages, some of which have already been discussed. More particularly, network environment 100 can provide for auto-provisioning buffers and data rates to meet application requirements with lossless operation, as well as plug-and-play networking. Automatic provisioning can enable lossless operation across any link distance with optimized bandwidth selection. Network environment 100 can also be used to allocate minimum dedicated buffer space in a buffer credit system (such as Fibre Channel) for improved credit utilization and/or to lower latency associated with high amounts of burst absorption buffering.

Network environment 100 may also automatically and reliably inform an administrator or other user if a link is too long for a given link bandwidth and buffer resources. User errors can be prevented, and precise distance measurements for fiber cuts become unnecessary. Delay drop time can also be dynamically adjusted with a scaled offset, or advertised to an administrator or other user for relative comparison, which may be particularly beneficial for long links. Lossless buffer space may be reclaimed if not needed, which can significantly increase efficient memory allocation. Transmission speed can be dynamically lowered to the minimum needed for lossless operation if there is insufficient buffering for a given link distance. For example, bandwidth may be dropped from 10 Gbps to 7 Gbps, instead of dropping to 1 Gbps because of a pre-configured vendor limitation. It is also possible to make the minimum buffering requirement a single Rx MTU with a low enough data rate.

Figure 8:
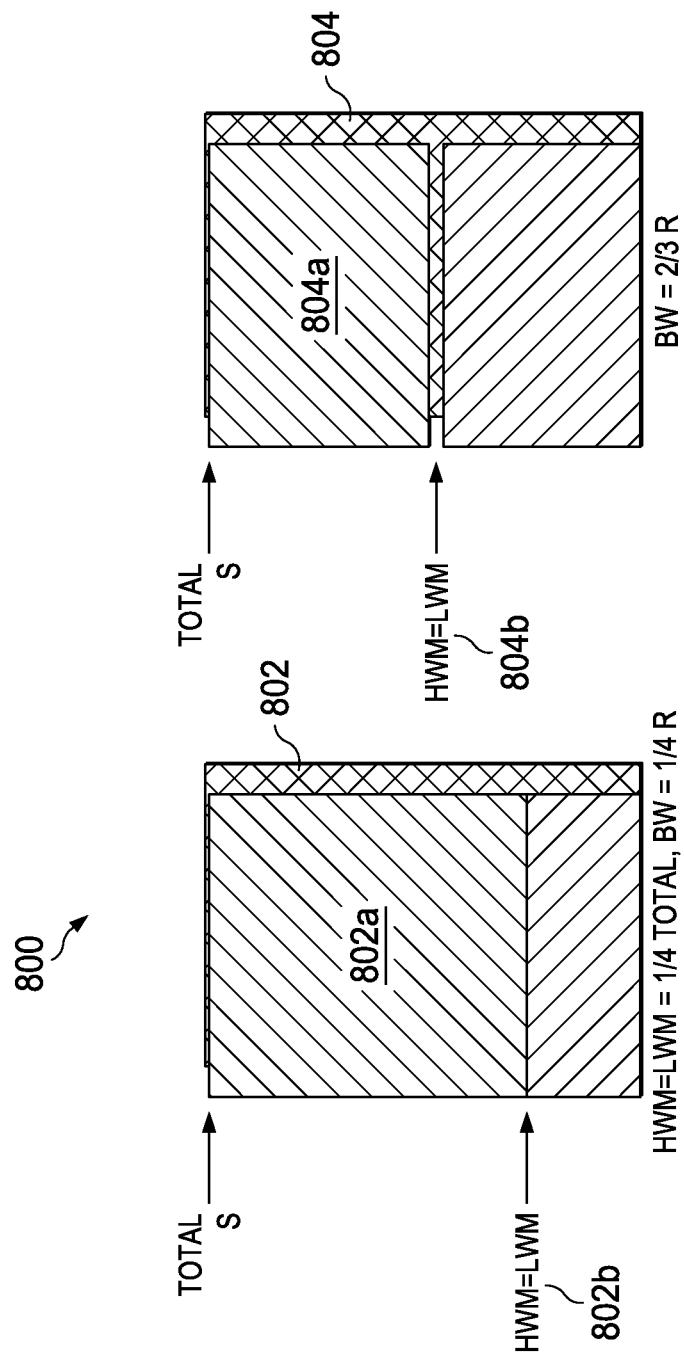
FIG. 8 is a simplified comparison chart illustrating advantages of one use case in which flow control throttling in the network environment.

FIG. 8 is a simplified comparison chart 800 illustrating one use case in which flow control throttling in network environment 100 may provide a significant advantage. In the example of FIG. 8, a buffer 802 represents allocation of buffer units in a threshold flow control system without rate limiting at distance 1.5D, and a buffer 804 represents allocation of buffer units in an embodiment of network environment 100 with rate limiting applied. Buffer 802 and buffer 804 are the same size S, and the distance D represents a distance at which a full line rate R can be supported. At distance D, the buffers are calibrated for full link utilization, such that absorption buffer (R*T) and the low-watermark are both ½ S, where T is the round-trip time (e.g., as measured by delay measurement module 214a or 214b). At 50% greater distance—i.e., 1.5D—absorption buffer 802a should be increased to ¾ S to provide a lossless operation without rate limiting. However, the PAUSE frequency increases such that LWM 802b (¼ S) can only support an effective bandwidth of ¼ R. In contrast, an effective bandwidth of ⅔ R can be supported by a LWM 804b (½ S) if the transmitter is rate limited and absorption buffer 804a is increased to ½ S.

As discussed above, some methodologies presented herein can solve certain recurring buffer issues in various switches, gateways, routers, etc. (i.e., network elements). In practical terms, the fact that certain equipment is simply a few meters off, and yet cannot be deployed is unnecessarily limiting. Instead of a hard distance limitation, by leveraging the teachings of the present disclosure, a given administrator or customer could reference a table in order to execute a few decisions on the equipment for their own network and, subsequently, observe the auto-provisioning feature (in real-time).

In the examples provided above, as well as numerous other potential examples, interaction may be described in terms of two, three, or four network elements. However, the number of network elements has been limited for purposes of clarity and example only. In certain cases, it may be easier to describe one or more of the functionalities of a given set of operations by only referencing a limited number of network elements. It should be appreciated that network environment 100 is readily scalable and can accommodate a large number of components, as well as more complicated/sophisticated arrangements and configurations. Accordingly, the examples provided should not limit the scope or inhibit the broad teachings of network environment 100 as potentially applied to a myriad of other architectures. Additionally, although described with reference to particular scenarios, where a particular module is provided within a network element, these modules can be provided externally, or consolidated and/or combined in any suitable fashion. In certain instances, such modules may be provided in a single proprietary unit.

It is also important to note that the appended diagrams illustrate only some of the possible scenarios and patterns that may be executed by, or within, network environment 100. For example, some operations may be deleted or removed where appropriate, or these operations may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by network environment 100 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    providing lossless operation in Fibre Channel over Ethernet (FCoE) comprising negotiating a link for transmission bandwidth requirements;
    measuring a delay between a transmitter and a receiver in a data network environment, comprising transmitting or receiving delay adjustment information in a control frame, wherein the receiver is associated with a buffer;
    determining a minimum absorption buffer size for lossless transmission to a queue associated with the buffer based on the delay and the transmission bandwidth requirement; and
    allocating buffer units from the buffer for the queue based on the minimum absorption buffer size,
    wherein,
        if the minimum absorption buffer size exceeds a buffer capacity available for the transmission bandwidth requirement and the transmission bandwidth requirement is determined to be a hard requirement, then negotiation of the link fails or a notification is generated, and
        if the minimum absorption buffer size exceeds a buffer capacity available for the transmission bandwidth requirement and the transmission bandwidth requirement is determined to be a soft requirement, then a rate-limiter is allocated.

2. The method of claim 1, wherein measuring the delay comprises measuring a round-trip time of a packet between the transmitter and the receiver.

3. The method of claim 1, wherein measuring the delay comprises measuring a round-trip time of a packet between the transmitter and the receiver with a link layer discovery protocol.

4. The method of claim 1, wherein measuring the delay comprises exchanging a precision time protocol message between the transmitter and the receiver.

5. The method of claim 1, wherein the transmission bandwidth is a line rate of the transmitter.

6. The method of claim 1, wherein the transmission bandwidth is configured as an application requirement.

7. The method of claim 1, further comprising:
    rate-limiting the transmitter, via the rate limiter, if the minimum absorption buffer size exceeds available storage of the receiver.

8. The method of claim 1, wherein the buffer is associated with more than one queue having a priority class, and wherein the transmitter is rate-limited per priority class, via the rate limiter, if the minimum absorption buffer size exceeds available storage of the receiver.

9. The method of claim 1, further comprising:
    rate-limiting the transmitter, via the rate limiter, to provide maximum transmission rate with available storage of the receiver if the minimum absorption buffer size exceeds the available storage of the receiver.

10. The method of claim 1, further comprising:
    reclaiming buffer units if available storage of the receiver exceeds the minimum absorption buffer size.

11. An apparatus, comprising:
    a delay measurement module;
    a calibration module;
    a memory element; and
    one or more processors operable to execute instructions associated with the delay measurement module, the calibration module, and the memory element such that the apparatus is configured for:
        negotiating a link for transmission bandwidth requirements;
        measuring a delay between a transmitter and a receiver in a data network environment, comprising transmitting or receiving delay adjustment information in a control frame, wherein the receiver is associated with a buffer;

determining a minimum absorption buffer size for lossless transmission to a queue associated with the buffer based on the delay and a transmission bandwidth requirement; and allocating buffer units for the queue based on the minimum absorption buffer size, wherein, if the minimum absorption buffer size exceeds a buffer capacity available for the transmission bandwidth requirement and the transmission bandwidth requirement is determined to be a hard requirement, then negotiation of the link fails or a notification is generated, and if the minimum absorption buffer size exceeds a buffer capacity available for the transmission bandwidth requirement and the transmission bandwidth requirement is determined to be a soft requirement, then a rate-limiter is allocated.

12. The apparatus of claim 11, wherein measuring the delay comprises measuring a round-trip time of a packet between the transmitter and the receiver.

13. The apparatus of claim 11, wherein measuring the delay comprises measuring a round-trip time of a packet between the transmitter and the receiver with a link layer discovery protocol.

14. The apparatus of claim 11, wherein measuring the delay comprises exchanging a precision time protocol message between the transmitter and the receiver.

15. The apparatus of claim 11, wherein the transmission bandwidth is a line rate of the transmitter.

16. The apparatus of claim 11, wherein the transmission bandwidth is configured as an application requirement.

17. The apparatus of claim 11, wherein the apparatus is further configured for rate-limiting the transmitter, via the rate limiter, if the minimum absorption buffer size exceeds available storage of the receiver.

18. The apparatus of claim 11, wherein the buffer is associated with more than one queue, each queue having a priority class, and wherein the transmitter is rate-limited per priority class, via the rate limiter, if the minimum absorption buffer size exceeds available storage of the receiver.

19. The apparatus of claim 11, wherein the apparatus is further configured for rate-limiting the transmitter, via the rate limiter, to provide maximum transmission rate with available storage of the receiver if the minimum absorption buffer size exceeds the available storage of the receiver.

20. Logic encoded in one or more non-transitory media that includes code for execution and when executed by one or more processors is operable to perform operations comprising:

negotiating a link for transmission bandwidth requirements;

measuring a delay between a transmitter and a receiver in a data network environment, comprising transmitting or receiving delay adjustment information in a control frame; wherein the receiver is associated with a buffer;

determining a minimum absorption buffer size for lossless transmission to a queue associated with the buffer based on the delay and a transmission bandwidth requirement; and allocating buffer units from the buffer for the queue based on the minimum absorption buffer size, wherein, if the minimum absorption buffer size exceeds a buffer capacity available for the transmission bandwidth requirement and the transmission bandwidth requirement is determined to be a hard requirement, then negotiation of the link fails or a notification is generated, and if the minimum absorption buffer size exceeds a buffer capacity available for the transmission bandwidth requirement and the transmission bandwidth requirement is determined to be a soft requirement, then a rate-limiter is allocated.

* * * * *